March 19, 1957 D. C. BLOHM ET AL 2,785,441
METHOD OF FORMING AN ELASTOMERIC
SUBSTITUTE FOR CHAMOIS LEATHER
Filed July 11, 1952

INVENTOR
MARION D. FORD
DOUGLAS C. BLOHM
BY Toulmin &Toulmin
ATTORNEYS

2,785,441
METHOD OF FORMING AN ELASTOMERIC SUBSTITUTE FOR CHAMOIS LEATHER

Douglas C. Blohm and Marion D. Ford, Dayton, Ohio, assignors to The Commonwealth Engineering Company of Ohio, Dayton, Ohio, a corporation of Ohio Application July 11, 1952, Serial No. 298,416

4 Claims. (Cl. 18—53)

This invention relates to a method of producing a rubber structure for use in cleaning.

It is an important object of this invention to describe a method for the production of a rubber product which may serve as a substitute for chamois and which during the course of operation is subjected to a foaming and then a tensioning to produce a desired cellular characteristic in the material.

These and other allied objectives are attained by foaming an elastomer which is capable of being cured, partially curing the foamed elastomer and then subjecting the partially cured material to a tensive stress beyond the elastic limit thereof to produce a deformation and reduction in size of the cells of the material. Thereafter, the cure of the material, while in the noted deformed condition, is completed.

The elastomer product produced as described above contains a myriad of small cells which impart to the material a squeegee characteristic similar to that found in chamois. It differs materially in this respect from the usual sponge rubbers in the possession of this squeegee action which permits liquids to be taken up readily; it is advantageous with respect to chamois in that the application of a slight pressure releases the water or other solvent readily.

In use the product of invention permits the damp wiping of a surface and removal of dirt and other matter therefrom without spotting; the larger pored usual sponges are defective in this respect as they generally tend to streak the surface to be cleaned.

With regard to the method of producing the pores it is only necessary to stretch the material beyond the elastic limit, where desired further stressing may be employed but it has generally been found that with natural rubber latex, synthetic rubber latices and vinyl plastisol dispersions that if the elastic limit is merely exceeded that the pore size is sufficient for the purposes of this invention.

The invention will be more fully understood by reference to the following detailed description and the accompanying drawings wherein.

Figure 1:
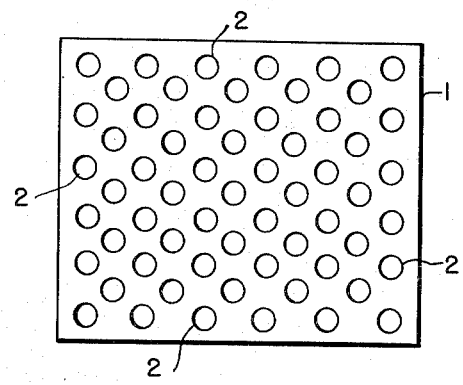
Figure 1 illustrates a slab of a foamed elastomeric material.
Figure 2:
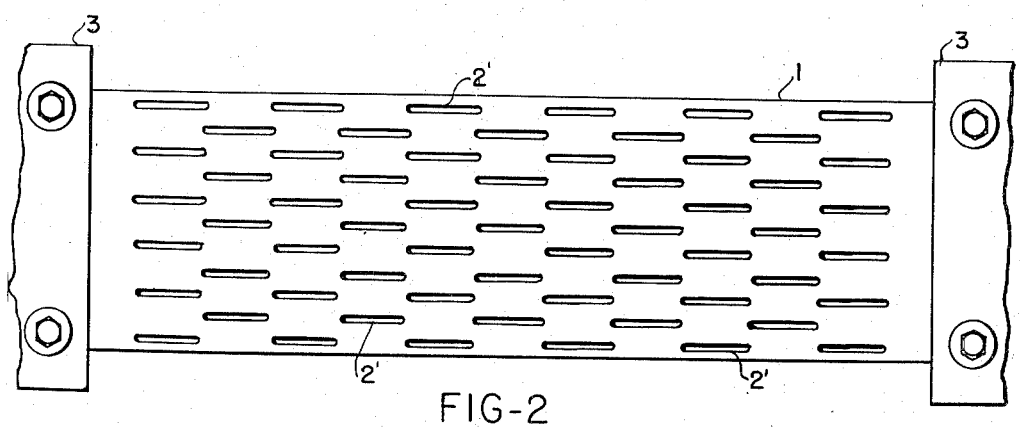
Figure 2 illustrates the slab of foamed material with the tensive stress applied.
Figure 3:
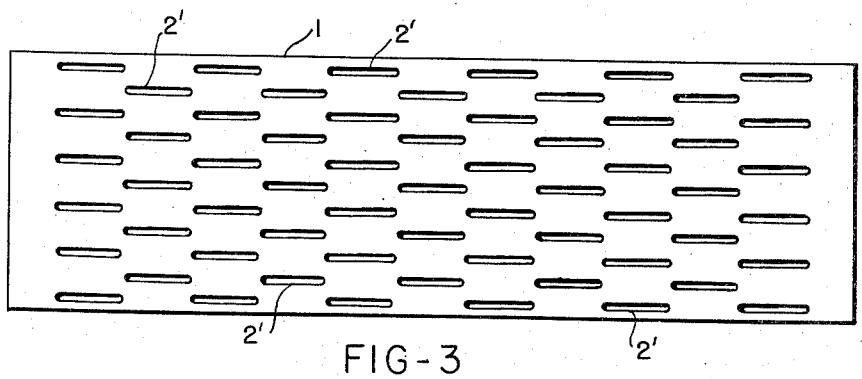
Figure 3 illustrates the slab of Figure 2 with the stress removed and the slab cured.

Referring to the figures it will be noted that the elastomeric material 1 is provided with pores 2 which in Figure 1 are substantially spherical, while in Figure 2 as indicated at 2' the tensive stress applied to the material has effectively elongated the walls of the pores flattening the same. This shape shown in Figure 2 with the tensive stress applied as at 3 is retained after removal of the stress as illustrated by Figure 3 since the stretching is effected beyond the elastic limit of the material.

As a specific example of the practice of the invention the following formulation was made up:

Example 1

|   | G. |
|---|---|
| Natural latex | 85 |
| Concentrated ammonia | 1.5 |
| Karaga solution | 15 |
| Curing mix | 36 |
| 40% yeast solution | .9 |
| 130 vol. hydrogen peroxide | 1.5 |

The natural latex is as provided by Nangatuck Chemical Company as #356, and containing approximately 68.5% latex solids. The ammonia is C. P. grade 28% $NH_3$ by weight.

The Karaga solution contains:

|   | G. |
|---|---|
| Water | 90.2 |
| C. P. ammonia | 7.5 |
| Natural Karaga gum-dry tech | 2.0 |
| Collatone crystalline powder containing para-chloro-meta-cresol preservative | .25 |

The curing mix contains as follows:

|   | G. |
|---|---|
| Dupont rubbermaker's sulfur | 300 |
| Zinc oxide—Kodox #2 (New Jersey Zinc Company) | 300 |
| Permalux-Dupont (di-ortho-tolyl guanidine salt of dicatechol borate) | 150 |
| Vanderbilt Darvan #1 (polymerized sodium salts of allylnapthalene sulfonic acids Vanderbilt P33 carbon black) | 50 |
| Ethyl zimate (Vanderbilt) (zinc diethyl dithiocarbamate) | 190 |
| Dupont Zenite (mercaptobenzo-thiazole) | 107 |
| Collatone crystalline powder containing para-chloro-meta-cresol (Lehn and Fink) (or other preservative) | 17 |
| 15% caseinate solution | 150 |
| Water | 1450 |

The caseinate solution is composed as follows:

|   | G. |
|---|---|
| Water | 77.2 |
| Casein glue (Casein Company of America, Div. of the Borden Co.) | 15.0 |
| C. P. ammonia | 7.5 |
| Collatone crystalline powder containing para-chloro-meta-cresol or preservative | .25 |

The mix as defined in Example I was stirred for one minute after addition of the hydrogen peroxide and poured thinly onto a flat metal sheet. After a one hour set the material was stretched by hand to about one and a half times its original length. The material was then given a one hour steam cure, after which it was cooled, washed with water and was then ready for use.

The invention described is intended to apply to the mechanical deformation of partly set artificial foam sheets, to produce desirable qualities which can be permanently incorporated by the final cure.

It applied not only to curable elastomers but as well to thermoplastics having elastomeric properties.

As a further example the vinyl plastisol dispersion and foaming agent were held at 250–300° F. for 15–20 minutes to form a foam. This structure was then mechanically deformed, maintained at 350° F. for about 20 minutes after removal of the deforming stress and then cooled.

It will be noted that this vinyl plastisol is a thermoplastic material and sets by gelling, while in the case of rubber a chemical reaction takes place to effect the curing.

It will be understood that this invention is susceptible to modification in order to adopt it to different usages and conditions and accordingly, it is desired to comprehend such modifications within this invention as may fall within the scope of the appended claims.

We claim:

1. A method of producing a porous elastomer product having a squeegee action comprising the steps of foaming a dispersion of an elastomer to produce cells, partially curing the foamed elastomer, tensively stressing the elastomer beyond the elastic limit thereof to reduce the size of said cells, and thereafter while the elastomer retains the cells of reduced size completing the curing of the elastomer.

2. A method of producing a rubber latex product having a squeegee action comprising the steps of foaming a dispersion of a rubber latex to produce cells, partially curing the foamed rubber latex, tensively stressing the rubber latex beyond the elastic limit thereof to reduce the size of said cells, and thereafter while the elastomer retains the cells of reduced size completing the curing of the rubber latex.

3. A method of producing a porous elastomer product having a squeegee action comprising the steps of foaming a dispersion of an elastomer to produce cells, partially curing the foamed elastomer, tensively stressing the elastomer beyond the elastic limit thereof to reduce the size of said cells, and thereafter while the elastomer retains the cells of reduced size air curing the elastomer.

4. A method of producing a porous elastomer product having a squeegee action comprising the steps of foaming a dispersion of an elastomer to produce cells, partially curing the elastomer in air, tensively stressing the elastomer beyond the elastic limit thereof to reduce the size of said cells, and thereafter while the elastomer retains the cells of reduced size air curing the elastomer.

References Cited in the file of this patent

UNITED STATES PATENTS

| Number | Name | Date |
|---|---|---|
| 1,608,727 | Dickey | Nov. 30, 1926 |
| 2,303,759 | Pippin | Dec. 1, 1942 |
| 2,308,951 | Novotny | Jan. 19, 1943 |
| 2,319,873 | Linz | May 25, 1943 |
| 2,336,944 | Madge | Dec. 14, 1943 |
| 2,384,387 | Meyer | Sept. 4, 1945 |
| 2,422,008 | Glassey | June 10, 1947 |
| 2,474,201 | Raymond | June 21, 1947 |
| 2,567,952 | Lewis | Sept. 18, 1951 |
| 2,567,988 | Bethe | Sept. 18, 1951 |
| 2,598,127 | Keckler | May 27, 1952 |